(12) United States Patent
Soucy et al.

(10) Patent No.: US 7,425,044 B2
(45) Date of Patent: *Sep. 16, 2008

(54) GUIDE HORN STRUCTURE FOR ENDLESS TRACK OF HIGH SPEED MULTI-TERRAIN VEHICLES

(75) Inventors: Gilles Soucy, Drummondville (CA); Claude Faucher, Drummondville (CA); André Deland, Drummondville (CA); Marc Delisle, Drummondville (CA)

(73) Assignee: Soucy International Inc., Drummondville, Quebec (CA)

( * ) Notice: Subject to any disclaimer, the term of this patent is extended or adjusted under 35 U.S.C. 154(b) by 306 days.

This patent is subject to a terminal disclaimer.

(21) Appl. No.: 11/283,939

(22) Filed: Nov. 22, 2005

(65) Prior Publication Data

US 2006/0125318 A1    Jun. 15, 2006

Related U.S. Application Data

(63) Continuation-in-part of application No. 09/984,307, filed on Oct. 29, 2001, now Pat. No. 7,090,312.

(30) Foreign Application Priority Data

Sep. 11, 2001    (CA) .................................. 2357140

(51) Int. Cl.
   *B62D 55/24* (2006.01)
(52) U.S. Cl. ..................... 305/178; 305/173; 305/193
(58) Field of Classification Search ................. 305/115, 305/157, 165, 178, 180, 160, 169, 173, 174, 305/195, 199, 179
   See application file for complete search history.

(56) References Cited

U.S. PATENT DOCUMENTS

| | | | |
|---|---|---|---|
| 2,120,753 A | | 6/1938 | Kegresse |
| 2,359,586 A | | 10/1944 | Saylor |
| 2,369,130 A | | 2/1945 | Benson |
| 2,409,502 A | | 10/1946 | Leguillon |
| 2,453,750 A | * | 11/1948 | Kamlookhine .............. 305/154 |
| 2,823,082 A | | 2/1958 | Bauer |
| 2,984,524 A | | 5/1961 | Franzen |

(Continued)

FOREIGN PATENT DOCUMENTS

EP    512467 B1    3/1995

(Continued)

*Primary Examiner*—Russell D Stormer
(74) *Attorney, Agent, or Firm*—Robert Brouillette; Brouillette & Partners LLP

(57) ABSTRACT

This invention relates to endless tracks and systems used to propel track laying vehicles [i.e., vehicles which use endless tracks rather than tires to contact the terrain over which they are driven, e.g., tractors, tanks, bulldozers, etc.] and, more particularly, to an improved rubber track design and system allowing the endless track to be driven more efficiently at highway speeds. The track is made from a polymer adapted to travel over a drive sprocket, a plurality of guide wheels and a tensioning wheel, the track having a first exterior ground engaging surface and a second interior drive sprocket engaging surface, the track comprising: a carcass portion in which reinforcements are embedded into the polymer; a plurality of tread lugs disposed on the first engaging surface; a plurality of drive lugs disposed on the second engaging surface and a plurality of guide horns disposed on the second engaging surface.

8 Claims, 11 Drawing Sheets

U.S. PATENT DOCUMENTS

| | | | |
|---|---|---|---|
| 3,148,921 | A | 9/1964 | Batur |
| 3,361,488 | A | 1/1968 | Ingemar |
| 3,472,563 | A | 10/1969 | Irgens |
| 3,575,474 | A | 4/1971 | Russ |
| 3,688,858 | A | 9/1972 | Jespersen |
| 3,722,962 | A | 3/1973 | Cooper |
| 3,730,013 | A | 5/1973 | Slemmons |
| 3,734,577 | A | 5/1973 | Snellman |
| 3,955,855 | A | 5/1976 | Massieon |
| 4,093,318 | A | 6/1978 | Edwards |
| 4,109,971 | A | 8/1978 | Black |
| 4,359,248 | A | 11/1982 | Kortering |
| 4,415,055 | A | 11/1983 | Ahn |
| 4,530,546 | A | 7/1985 | Meisel |
| 4,588,233 | A | 5/1986 | DenBesten |
| 4,714,302 | A | 12/1987 | Svensson et al. |
| 4,861,120 | A | 8/1989 | Edwards |
| 4,904,030 | A | 2/1990 | Ono |
| 5,005,922 | A | 4/1991 | Edwards |
| 5,141,299 | A | 8/1992 | Korpi |
| 5,190,363 | A | 3/1993 | Brittain et al. |
| 5,273,126 | A | 12/1993 | Reed |
| 5,279,378 | A | 1/1994 | Grawey |
| 5,295,741 | A | 3/1994 | Togashi |
| 5,368,376 | A | 11/1994 | Edwards |
| 5,447,365 | A | 9/1995 | Muramatsu |
| 5,482,364 | A | 1/1996 | Edwards |
| 5,484,321 | A * | 1/1996 | Ishimoto .................... 446/433 |
| 5,511,869 | A | 4/1996 | Edwards |
| 5,536,464 | A | 7/1996 | Muramatsu |
| 5,540,489 | A | 7/1996 | Muramatsu |
| 5,769,512 | A | 6/1998 | Kautsch |
| 5,902,017 | A | 5/1999 | Kurata |
| 5,984,438 | A * | 11/1999 | Tsunoda et al. ............ 305/169 |
| 6,000,766 | A | 12/1999 | Takeuchi et al. |
| 6,039,405 | A | 3/2000 | Kurata |
| 6,129,426 | A | 10/2000 | Tucker |
| 6,139,121 | A | 10/2000 | Muramatsu |
| 6,206,492 | B1 | 3/2001 | Moser |
| 6,241,327 | B1 | 6/2001 | Gleasman |
| 6,267,458 | B1 | 7/2001 | Hansen |
| 6,536,852 | B2 * | 3/2003 | Katayama et al. .......... 305/170 |
| 6,793,296 | B2 * | 9/2004 | Deland et al. .............. 305/167 |
| 6,869,153 | B2 * | 3/2005 | Wright et al. .............. 305/169 |
| 6,932,442 | B2 * | 8/2005 | Hori .......................... 305/171 |
| 2004/0145239 | A1 * | 7/2004 | Deckler et al. ............. 305/193 |

FOREIGN PATENT DOCUMENTS

| | | |
|---|---|---|
| FR | 2537183 A1 | 6/1984 |
| FR | 2683201 A1 | 5/1993 |
| JP | 3-235768 | 10/1991 |
| JP | 6-32262 | 2/1994 |
| JP | 6-87473 | 3/1994 |

* cited by examiner

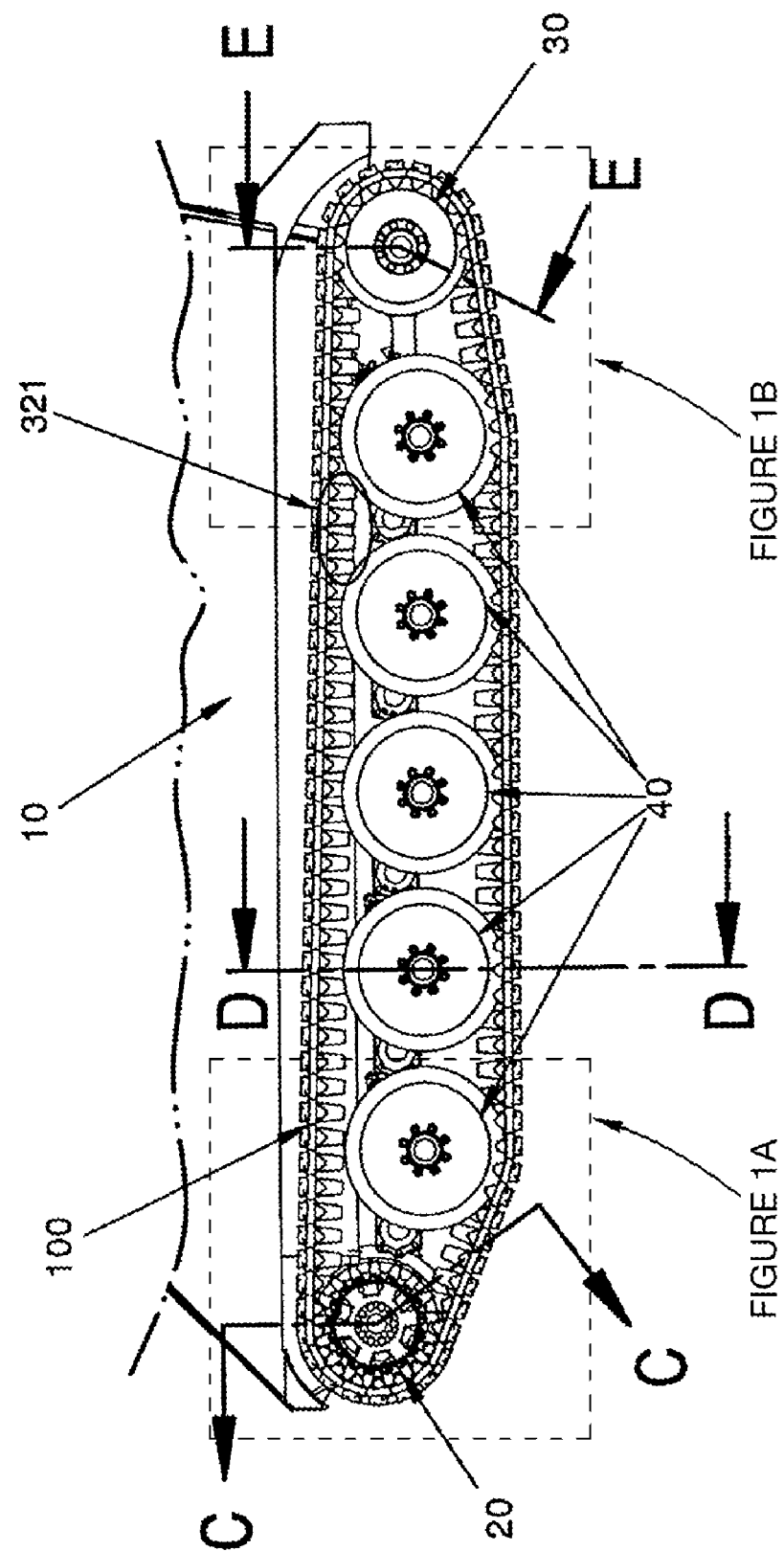

GUIDE HORN STRUCTURE FOR ENDLESS TRACK OF HIGH SPEED MULTI-TERRAIN VEHICLES

RELATED APPLICATION DATA

This present patent application is a continuation-in-part of commonly assigned U.S. patent application Ser. No. 09/984,307, filed on Oct. 29, 2001 and entitled "Endless Track for High Speed Multi-Terrain Vehicles", now U.S. Pat. No. 7,090,312, the content of which is incorporated herein by reference.

BACKGROUND OF THE INVENTION

1. Field of the Invention

This invention relates to endless tracks used to propel track laying vehicles [i.e., vehicles which use endless tracks rather than tires to contact the terrain over which they are driven, e.g., tractors, tanks, bulldozers, etc.] and, more particularly, to an improved rubber track design allowing the endless track to be driven more efficiently at highway speeds.

2. General Discussion

Numerous types of vehicles are frequently used in terrain in which it is difficult for pneumatic tires to operate. Both military vehicles, such as tanks and amphibious vehicles, and civilian vehicles, such as tractors and recreational vehicles, are sometime utilized on terrains which are very soft, for example sand surfaces. Pneumatic tires are not capable of efficient operation on such soft surfaces, as they tend to burrow into the surface, rather than riding across the surface.

Endless track vehicles have been developed for use on terrains in which pneumatic tired vehicles are impractical. See for example U.S. Pat. No. 3,361,488 (Ohm et al), U.S. Pat. No. 3,688,858 (Jespersen), U.S. Pat. No. 3,734,577 (Snellman) and U.S. Pat. No. 3,955,855 (Massieon et al). In many types of terrain these vehicles provide improved performance relative to the performance of pneumatic tired vehicles; still, difficulties are encountered with existing endless track vehicles.

Originally, such tracks were made of a plurality of metal links or shoes pivotally attached to each other to form an endless track which are very heavy, cause serious damage to roads and other surfaces on which they run and result in an uncomfortable ride for the passengers. See for example U.S. Pat. No. 2,823,082 (Bauer) and U.S. Pat. No. 4,530,546 (Meisel, Jr.). Heavier vehicles still use metal tracks.

The above referenced conventional tracks have the disadvantages of being noisy and vibration prone, not sufficiently durable and/or not usable on road surfaces. This is because of the conventional configurations and use of metal parts. Accordingly, substantial efforts have been made to construct quieter, smoother operating and more durable tracks for tracked vehicles.

A need has developed for a form of vehicle appropriate for both normal highway use and off road use over snow covered, very uneven, or muddy terrain. There is significant need for such a vehicle not only during armed conflicts but also following natural emergencies (snow and wind storms, floods, etc.), and such vehicles are at present particularly needed in developing countries. Unfortunately, almost all available automotive vehicles require infrastructure (paved highways, bridges, etc.) for practical operation, and the developing countries are decades away from having the necessary infrastructure for such conventional vehicles. Further, most load carrying off road vehicles presently in use have either very large wheels or very cumbersome tracks which are heavy, slow moving, and inappropriate for use on paved roads at normal highway speeds.

Rubber endless tracks have become popular due to an increase in construction in urban areas where vehicles having tracks must drive on the pavement and because there is a demand for low soil compaction farming. With the combination of rubber technology and a tremendous amount of trial and error, various types of rubber tracks are now available in the industry. They are used on excavators, dump carriers, boring machines, combines, tractors, and the like See for example U.S. Pat. No. 5,279,378 (Graiwey & al) and U.S. Pat. No. 6,267,458 (Hansen et al). Most of them operate on the job site only and are transported between sites by trucks or trailers. To eliminate the inconvenience of transporting the vehicle between job sites, a vehicle which can operate both on public roads at normal speeds and in off road construction environments is required. However, such a vehicle will have to be constructed so as to provide little damage to the pavement, include less vibration and noise, and operate with less maintenance and lubrication. Furthermore, vibrations to be transmitted to occupants are mitigated and paved roads are not significantly damaged.

A number of hybrid tracks have been proposed where the links or shoes are made of metal which is provided with a rubber cover or insert. See for example U.S. Pat. No. 2,359,586 (Sayler), U.S. Pat. No. 2,369,130 (Benson), U.S. Pat. No. 2,409,502 (Leguillon et al), U.S. Pat. No. 3,148,921 (Batur et al), U.S. Pat. No. 4,109,971 (Black et al), U.S. Pat. No. 4,359,248 (Kortering) and U.S. Pat. No. 4,588,233 (Den-Besten).

3. Description of the Related Art

[NOTE: As used herein, the term "rubber" relates to any elastic and primarily non metallic materials such as rubber, elastomers, or other polymers and/or combinations thereof used in the manufacture of endless tracks].

Most rubber tracks are formed around a basic carcass or belt. The carcass includes an endless belt shaped rubber like elastic member, a number of core bars (usually of metal) embedded therein and aligned in the longitudinal direction thereof and extending in traverse directions thereof, and steel cords (tension resistant members) embedded in the endless elastic member to surround the core bars circumferentially outwardly. See for example U.S. Pat. No. 4,904,030 (Ono), U.S. Pat. No. 5,295,741 (Togashi et al), U.S. Pat. No. 5,511,869 (Edwards et al) and U.S. Pat. No. 6,241,327 (Gleasman).

Some have suggested the construction of endless rubber tracks using a plurality of interconnected polymeric modules. See for example U.S. Pat. No. 4,861,120 (Edwards et al) U.S. Pat. No. 5,005,922 (Edwards et al).

Terrain contacting lugs are formed integral with the exterior surface of this basic belt element. Known rubber tracks include large lugs having a variety of well known orientations, e.g., formed generally perpendicular to the track axis, or at an angle to the track axis, or in a chevron or modified chevron design. These latter special tracks also include interior lugs or horns for maintaining the track in alignment as it travels over the circumferences of the rubber tired wheels, such lugs being located either in the centre of the interior surface of the track (for designs appropriate for fitting between the tires of dual wheels) or in two aligned rows near the outside edges of the track (for receiving a single tire there between). See for example U.S. Pat. No. 5,447,365 (Muramatsu & al) and U.S. Pat. No. 5,540,489 (Muramatsu & al).

The tracks are carried by a plurality of rotating elements (wheels, sprockets, etc. . . . ) mounted on the track laying vehicle, the tracks being maintained in circumferential contact with these rotating elements and being driven thereby (or, in the case of trailer-like non driven vehicles, being supported for rotation thereon).

Problems encountered in actually reducing such an endless rubber track to practice include how to maintain adequate tension on such belt, how to drive such tracks and keeping the belt in lateral alignment with the wheels when the wheels are subject to large lateral loads. Other problems are maintaining the structural integrity and providing long life for the belt, mid rollers, drive wheels, and idler wheels.

While smaller rubber tracked vehicles are commercially available, these do not carry adequate loads for military vehicles (including tanks), normal multi passenger or produce transports, and their drive wheels can easily become mired in heavy mud or snow.

As stated in U.S. Pat. No. 5,295,741 (Togashi et al), when a vehicle equipped with rubber tracks moves on sandy terrain or quarries, the rubber tracks are likely to shift from advancing directions of the vehicle due to elongations and contractions of the rubber-like material in vertical and horizontal and other directions. As a result, the rubber tracks unavoidably get off the sprocket wheels or track rollers of the vehicle. Various attempts have been made in order to prevent the dislodgement of the rubber tracks from the vehicle, but they have not met with success.

Known rubber tracks, when mounted on the rotating wheels of vehicles, exert distinct resistive forces that must be overcome to move the vehicle, i.e., resistive forces in addition to those forces created by the load being carried and/or generated by the terrain. These further resistive forces relate to the additional tensions required to stretch the heavy lugs of the tracks around the wheels over which they are mounted and to the additional friction generated between the tracks and the terrain. While the latter frictional resistive forces are a valuable attribute under wet or snowy conditions, they add undesirably to energy costs when driving the vehicle over flat, hard surfaces.

The aforementioned patents are representative of a large body of patents which purport to solve one or more of the rubber track system implementation problems. Such body of patents constitutes documentary evidence that efforts to achieve this blend of track and wheel propulsion systems have been exerted for over half a century without realizing any practical measure of success. Solutions to the problems of actually implementing a heavy-duty vehicular rubber track drive system have proven elusive and scientific scaling techniques have not, to date, been successfully applied to light duty vehicles for purposes of developing a heavy duty rubber track system. Thus, despite the long felt need for and the advantages thereof, a heavy duty application vehicle utilizing such rubber track system is commercially unavailable today.

For this reason, most military tracked vehicles are still equipped with metallic tracks. In an effort to reduce the inconveniences related to such metallic track systems, some tracks are provided with rubber pads on the ground engaging side of the metallic track.

However, these metallic tracks still present significant inconveniences in relation to wheeled vehicle. Some of these problems can be summarized as follows:

Noise. The metallic track produces an excessively high level of noise. This fact can cause a significant strategic disadvantage when used in association with military vehicles since the enemy can detect the presence of the military vehicle many miles away.

Damage. With respect to civilian vehicles equipped with such tracks or military vehicles used in peace keeping missions, the metallic tracks can cause significant damage to the ground surface whether it be paved or not.

Weight. Metallic tracks are very heavy. For example the typical weight of a metallic track used on an M113 tank is 1200 pounds while the metallic track used on a Bradley tank is 2500 pounds. Such a weight is both an inconvenience with respect to the mobility of the vehicles and with respect to their consumption of fuel.

Short lifespan. Metallic tracks have a short lifespan. Even metallic tracks provided with rubber pads wear out extremely rapidly such that the pads need to be replaced every 500 to 1000 miles on a military tank.

Maintenance. Metallic tracks also require a lot of maintenance. The replacement of the rubber pads, the metallic links or shoes, etc. requires a continuous maintenance of the tracks.

Costs. Finally, the cost of manufacturing, maintenance and refurbishing are extremely high.

As seen above, efforts to develop a rubber alternative to metallic tracks have been relatively successful in relation to "light" vehicles. However, such rubber tracks, although an improvement in many respects over the known metallic tracks still have the following shortcomings in relation to heavy equipment such as tanks:

De-tracking. De-tracking is a phenomenon by which a track loses contact with the guiding system such that it will completely remove itself from the vehicle and thus cause it to stop. To limit this phenomenon, more or less rigid protuberances or guide horns are disposed along the interior portion of the track to form a rampart which fits between guide wheels. These wheels are generally grouped in pairs and the space between the wheels allows the guide horns to past freely between them. Another element which is important to reduce de-tracking is the use of an appropriate tension wheel.

Teeth Skipping. Tracks are powered by a motor mechanically connected to a sprocket which engages protuberances or drive lugs on the inside surface of the track. If these drive lugs are allowed to skip over the teeth of the sprocket, damages to and premature wear of the track will occur. The abrupt movements which result also cause significant discomfort to the passengers of the vehicle. In order to diminish such teeth skipping phenomenon, the drive lugs on the track must produce as small a friction as possible on the sprocket while allowing the sprocket to firmly engage the track. Again, tensioning of the track is a critical element.

Wear and tear. Tracks can also prematurely break down due to a number of other internal and external elements such as: breakage of reinforcing rods, tearing of the reinforcing fabric, cables and fibres and the abrasion, piercing, tearing and delamination of the rubber components.

The prior art solutions which are adapted for regular industrial and agricultural vehicles are inadequate when faced with the severity of the problems faced by military vehicles. Indeed, the high weight of military vehicles combined to the high speeds and strong accelerations (both lateral and longitudinal) create high stresses in the track which considerably amplify the aforesaid problems.

SUMMARY OF THE INVENTION

It is, thus, the objective of this invention to provide a workable solution to the problems by taking into account that such vehicle's undercarriage, to be truly useful, should be roadable, provide high traction and low ground compression, and minimally disturb the underlying terrain, as well as operate in the heavy duty working mode and provide a smooth ride for the operator in most soil conditions and topography from level land to steep inclinations while performing useful work without breaking the belts, losing drive capability between engaged wheels and belts, or disengaging the belts from the wheels.

It is an object of the present invention to reduce such de-tracking, teeth skipping and wear and tear on all types of vehicles (military, industrial, agricultural and others).

It is another object of the present invention to replace metallic tracks by a reinforced rubber track which provides the advantages of metallic tracks (including good traction, support and adaptability to all types of terrain) while diminishing significantly the disadvantages (noise, damage to the ground surface, weight, short lifespan, maintenance and high costs).

There is therefore provided a track for use on a tracked vehicle made from a polymer adapted to travel over a drive sprocket, a plurality of guide wheels and a tensioning wheel, the track having a first exterior ground engaging surface and a second interior drive sprocket engaging surface, the track comprising:

a carcass portion in which reinforcing means are embedded into the polymer;
a plurality of tread lugs disposed on the first engaging surface;
a plurality of drive lugs disposed on the second engaging surface;
a plurality of guide horns disposed on the second engaging surface, each the guide horn having a forward surface, a rear surface, a top surface and two lateral surfaces;
wherein the upper forward portion of each the lateral surface is beveled and the top surface tapers toward the front surface.

While the invention is applicable to endless tracks for all track laying vehicles, its particular purpose is to increase the efficiency of heavy track laying all terrain vehicles such as military tanks that are specifically designed for normal speed travel over paved highways as well as for appropriate use over unpaved roads and uneven off road terrain.

Other aspects and many of the attendant advantages will be more readily appreciated as the same becomes better understood by reference to the following detailed description and considered in connection with the accompanying drawings in which like reference symbols designate like elements throughout the figures.

The features of the present invention which are believed to be novel are set forth with particularity in the appended claims.

BRIEF DESCRIPTION OF THE DRAWINGS

Accordingly it is intended that the foregoing disclosure and showing made in the drawings shall be considered only as an illustration of the principle of the present invention.

FIG. 1 is an overall side view of a track system in accordance with the invention.

FIG. 1 shows a general side view of a rubber track system in accordance with this invention installed on a military vehicle 10. The track system comprises an endless reinforced rubber track 100, a sprocket wheel 20, a tension wheel 30 and a plurality of guide wheels 40 which support the vehicle and guide the track 100. This system is coupled to appropriate drive means (not shown) through an appropriate suspension system (not shown). A similar system is disposed on the other side of the vehicle 10.

As shown in FIGS. 2 and 3, a track 100 is typically built around a belt like carcass 150 made of reinforced rubber. As noted above, the term "rubber" relates to any appropriate elastic polymer. The track 100 comprises an external surface 200 and an internal surface 300. As shown in FIG. 2, a plurality of traction lugs 210, 220 and 230 are disposed on the exterior surface 200. These traction lugs or tread interact with the surface on which the vehicle 10 is being displaced to ensure appropriate traction of the vehicle. The traction lugs are made out of a sufficient quality of rubber to support the normal wear of the tread due to abrasion.

As shown in FIG. 3, the interior surface 300 of the track 100 comprises:

Figure 1A:
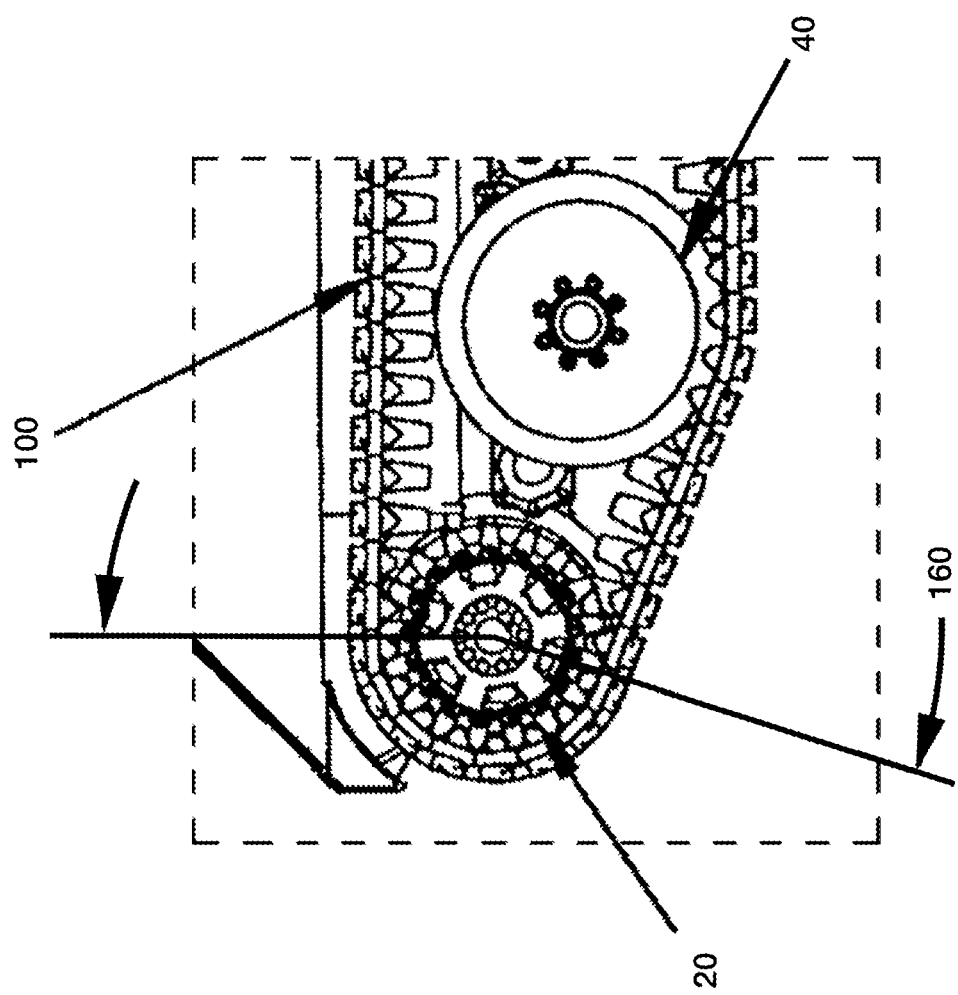
FIG. 1A is a fragmentary and enlarged side view of the sprocket wheel region of the track system shown in FIG. 1.

a plurality of guide horns or lugs 320 which are consecutively located along the longitudinal center line of the interior surface 300. These guide lugs or horns form a quasi continuous rampart 321 (best shown in FIG. 1) which fits in the gorge 29 formed in the sprocket wheel 20 (see FIG. 7), gorge 39 formed between the outer and inner wheel portions 32 and 34 of the tension wheel 30 (see FIG. 10) and the opening 49 between the wheels 41 and 42 which form the guide wheel 40 (see FIG. 8). The mating of the guide horns with the gorges and/or openings 29, 39 and 49 allows the track to be guided during the movement of the vehicle;
a plurality of protuberances 330 which are called traction lugs are provided along each side of the track 100. These traction lugs are designed to matingly engage with corresponding cavities 23 in the sprocket wheel 20. They thus ensure the transmission of power from the motor (not shown) to the track 100; and
flat running surfaces 310 and 315 are provided on each side of the guide horns 320. The support wheels 40 running on these running surfaces support the weight of the vehicle 10.

Figure 3:
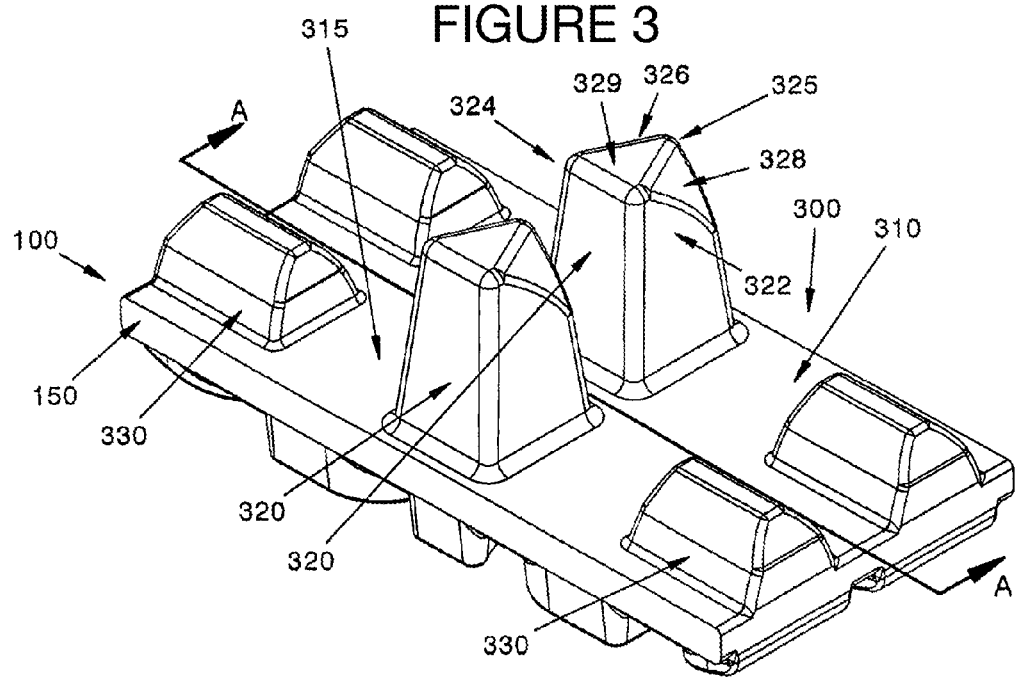
FIG. 3 is a perspective bottom view of the track shown in FIG. 2.
Figure 4:
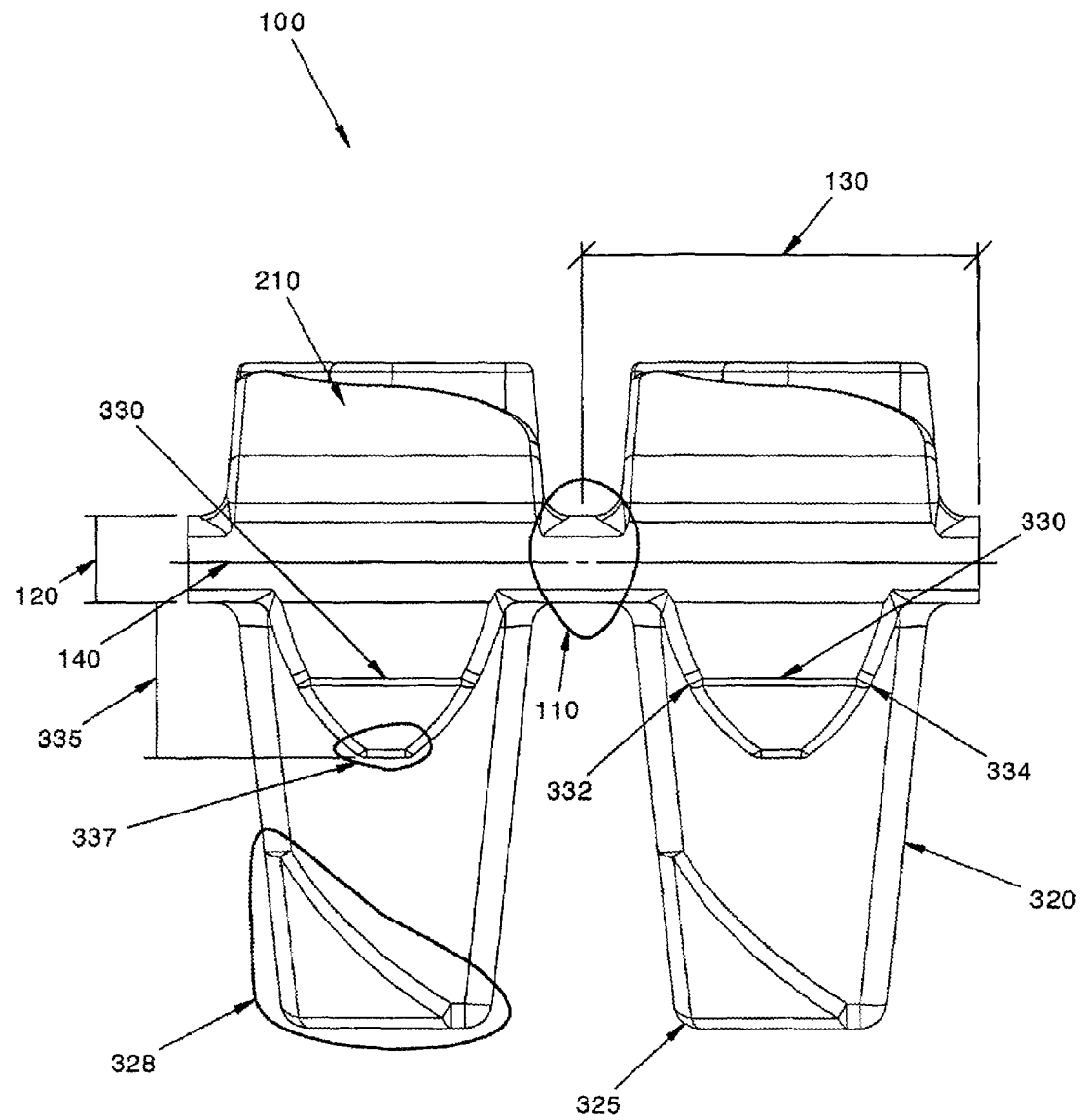
FIG. 4 is a side view of the track shown in FIG. 2 taken generally along line B-B as shown in FIG. 2.

As illustrated in FIGS. 3 and 4, the guide horns 320, the traction lugs 330 and the exterior tread lugs 210, 220 and 230 are placed on the track in such a way as to form successive segments each having an identical pitch 130. The various section are separated by sections 110 of the carcass 150 on which no lug, horn or other protuberance is located thus forming a hinge which will allow the track to wrap itself around the various wheels forming the track system of this invention. When used in relation to a military tank such as an M113 tank, the pitch 130 is preferably between two inches and six inches. However, for a given sprocket wheel diameter, it is preferable to reduce the pitch in order to increase the number of drive lugs 330 which at any given time are engaged into the sprocket cavities 23. The minimum number of drive lugs 330 which are in contact with cavities 23 at any given time should be four.

In order to optimise the interaction between the track and the other components of the track system to reduce de-tracking, skipping of teeth and wear and tear, it is preferable that each component be optimised as described hereunder.

As illustrated in FIG. 1 and more particularly in FIG. 1A, when the track system is properly installed on vehicle 10, track 100 is disposed around the sprocket wheel 20 such that the wrap angle 160 can vary from one vehicle to the other but is usually comprised between 30 degrees and 180 degrees.

Figure 6:
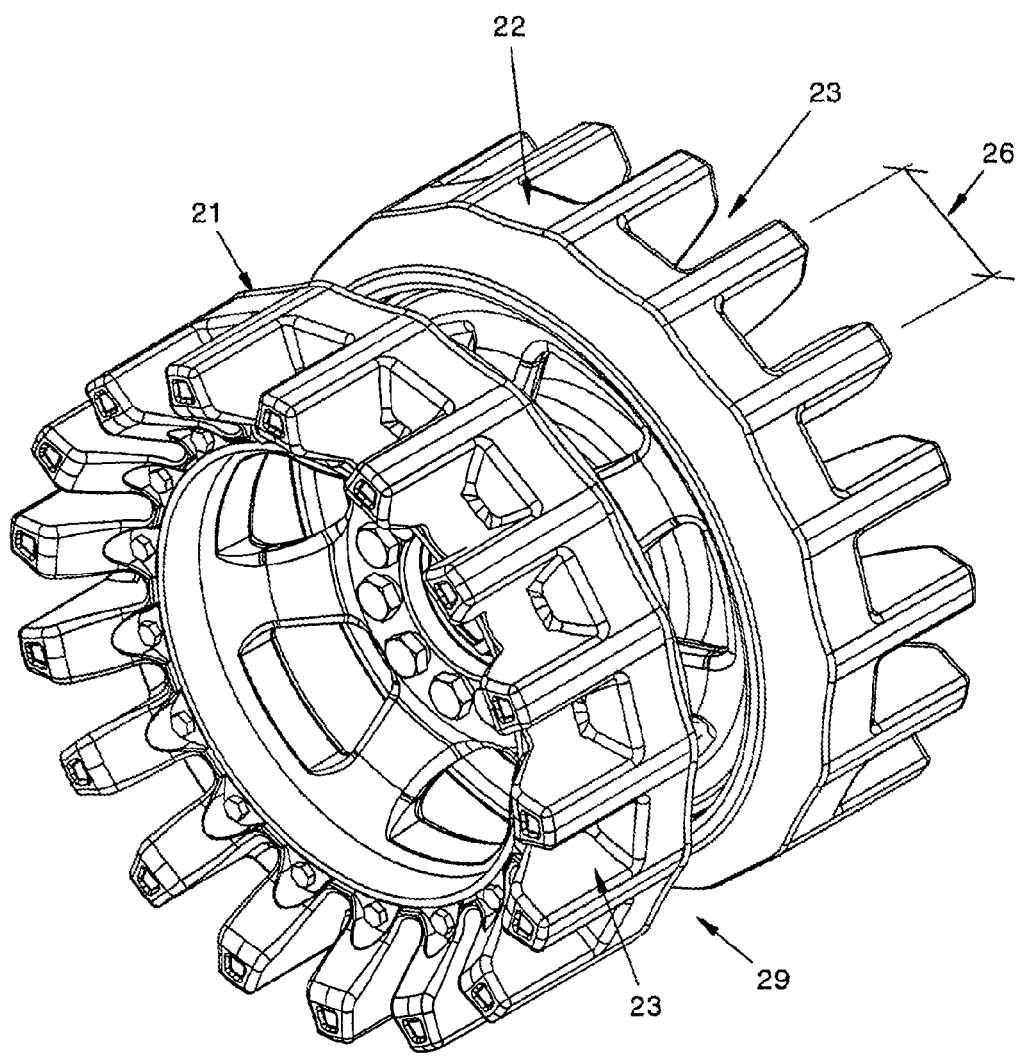
FIG. 6 is a perspective view of a sprocket wheel use to power a track in accordance with this invention.

The sprocket wheel 20 is rigidly coupled to the motor (not shown) through appropriate transmission means (also not shown). As depicted in FIG. 6, the sprocket wheel 20 comprises two wheel portions between which the gorge 29, mentioned earlier, is defined. The outer perimeter 21 of each sprocket wheel portion is facetted such as to define a substantially polygonal perimeter when viewed from the side. Each facet 22 of the outer perimeter 21 has a length or pitch 26 and further comprises one traction lug receiving cavity 23.

Because the principal purpose of this sprocket wheel 20 is to transmit power from the motor to the track 100, it is important to ensure a firm engagement between the track traction lugs 330 and the corresponding cavities 23 in the sprocket wheel 20. Appropriate engagement is obtained when the track does not slide sideways or skip teeth on this sprocket wheel 20. Proper engagement is itself dependant on a certain number of principal factors which summarised below.

Figure 7:
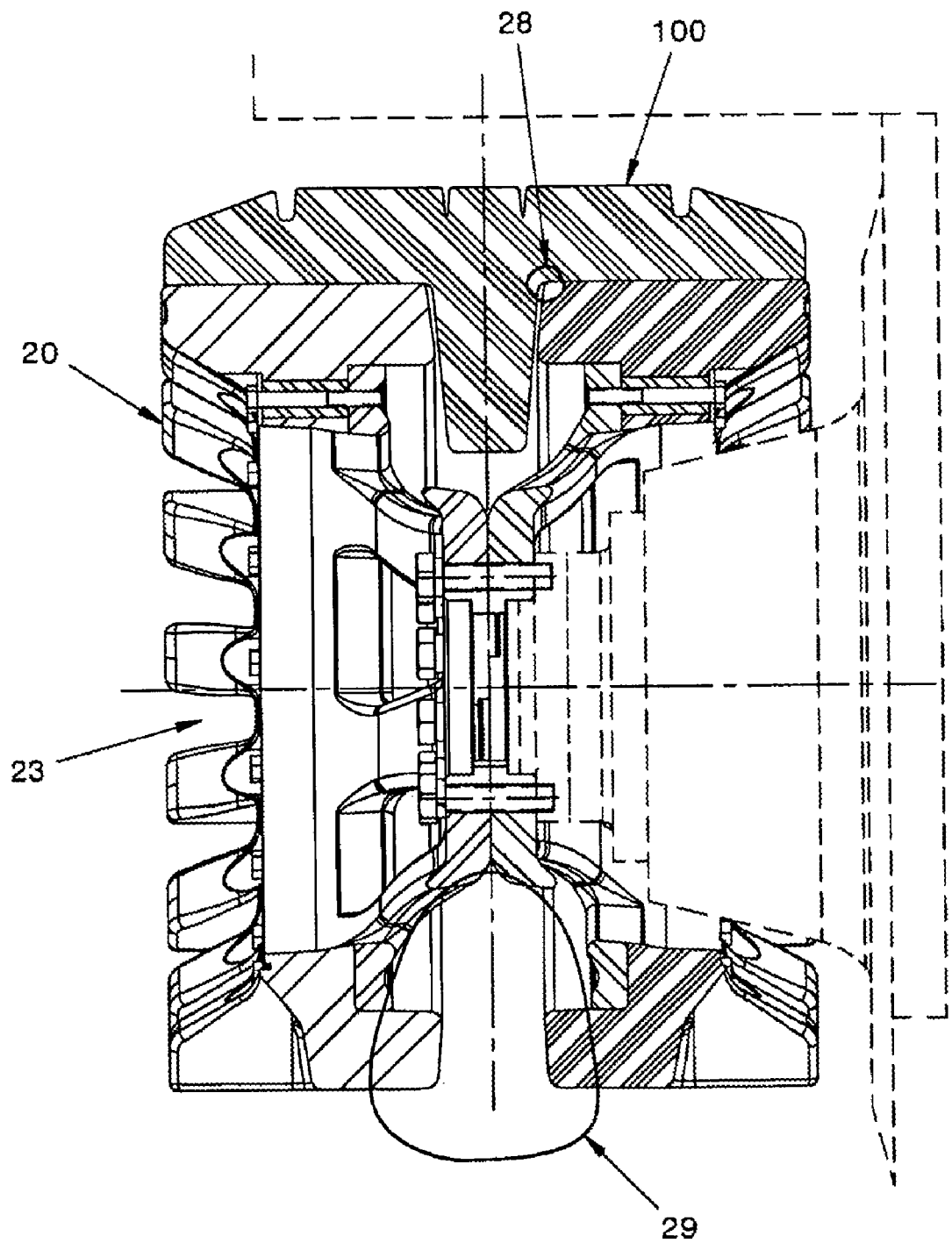
FIG. 7 is a cross sectional view of the sprocket wheel shown in FIG. 6 taken generally along line C-C as shown in FIG. 1.

As depicted in FIG. 7, the lateral displacements of the track 100 on the sprocket wheel 20 are prevented by the presence of the guide horns 320 which engage in the gorge 29 (which separates the sprocket wheel into parts). However, it is preferable that the width of the gorge be slightly larger (but not too much) than the width of the guide horns. The recommended spacing 28 (best shown in FIG. 7) for a M113 tank is between $\frac{1}{16}$" and $\frac{3}{32}$".

The lateral displacements and longitudinal displacements (resulting in teeth skipping) of the track 100 are further prevented by the mating of the traction lugs 330 within the corresponding cavities 23 in the sprocket wheel 20. The quality of the mating itself depends on several factors.

First, the longitudinal tension in the track 100 must be great enough so that the vertical component of the tension forces compensates for the forces which extend radially between the walls of cavities 23 and those of the traction lugs 330.

Second, these contact forces depend on the material which are used and of the geometric forms given to these surfaces.

Third, the maintenance of the quality of these surfaces depends on the conditions of operation, the elastic deformation and wear.

The wrap angle 160 formed by the belt when it is wrapped around the sprocket wheel 20 (see FIG. 1A) as well as the number of traction lugs 330 engaged in the cavities 23 of the sprocket wheel 20 have a significant impact on the lateral, tangential and vertical displacements of the track 100.

It has been determined by trial and error that:
 i. the sprocket wheel 20 should contain a minimum of twelve (12) and preferably fifteen (15) cavities 23 on each part thereof;
 ii. the number of traction lugs 330 engaged in the cavities 23 must preferably be equal or larger than four (4) to ensure a firm engagement and reduce the chances of teeth skipping;
 iii. the shape and dimensions of the cavities 23 are in direct relationship to those of the drive lugs 330. We have found that it is preferable that the pitch 130 of the track 100 be slightly smaller than the pitch 26 of the facets 22 of the outer perimeter 21 of the sprocket wheel 20. The difference should preferably be between 0% and 1% in order to compensate for stretch during high efforts and wear during the useful life of the track;
 iv. the use of a polymeric material having a high mechanical resistance and high resistance to abrasion is preferable. In this respect, UHMW polyethylene is one of the preferred materials;
 v. gorge 29 in this sprocket wheel 20 should preferably be "V"-shaped to facilitate the installation of the track 100 on the vehicle 10; and
 vi. as shown in FIGS. 3 and 4, the traction lugs 330 have an anterior surface 332 and a posterior surface 334 presenting a generally prismatic contour. The actual cross section of these traction lugs is preferably of the type described in U.S. Pat. No. 4,605,389 (Westhoff) which is incorporated herein by reference. The length of the tangent t used in the traction equation $x2(1+y2)=t2$ is a function of the thickness 120 of the track 100, of the position of the neutral axis 140 and of the height 335 of each traction lug 330. Such a profile procures an optimal interface during the operation of the vehicle.

Figure 5:
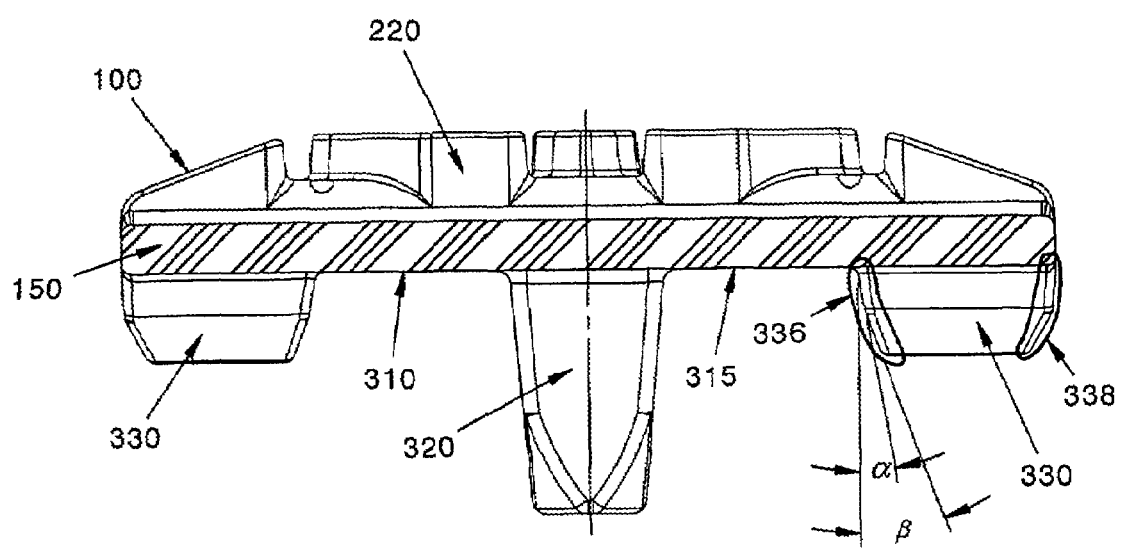
FIG. 5 is a cross section of the track shown in FIGS. 2 and 3 taken generally along line A-A as shown in FIG. 3.
Figure 8:
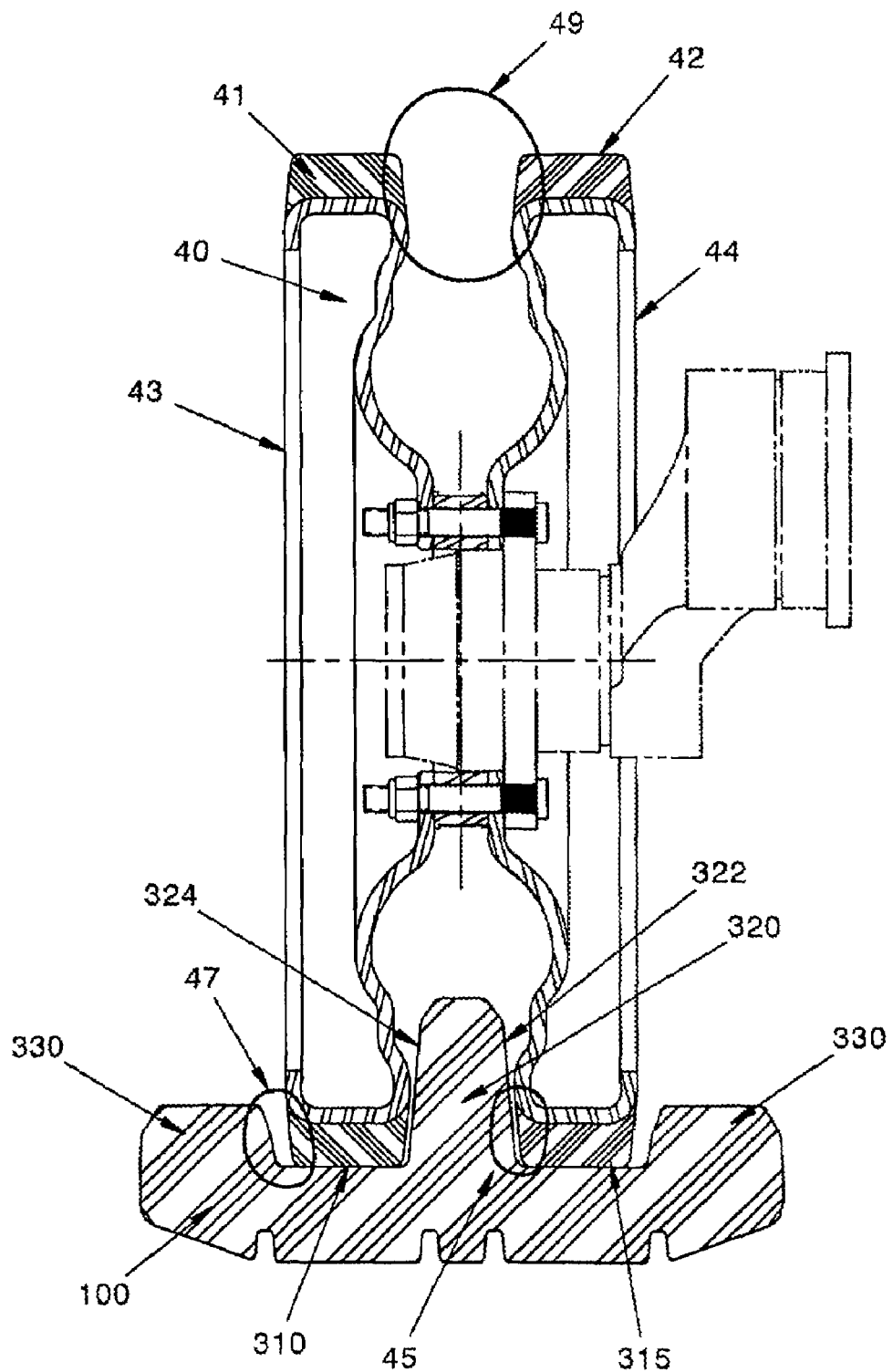
FIG. 8 is a cross sectional view of the guide wheel taken generally along line D-D as shown in FIG. 1.

We have determined by experimentation that the traction lugs 330 should preferably have the following characteristics:
 i. as depicted in FIG. 5, the interior surface 336 should be slightly inclined by a first angle $\alpha$ which is preferably superior to 3 degrees and by a second angle $\beta$ which is preferably greater than the first angle $\alpha$ to prevent interference with the wheels 40;
 ii. as depicted in FIG. 8, the spacing 47 between the wheels 40 and the traction lugs 330 should be large enough (larger than spacing 45 between the wheels 40 and the guide horns 320) so that the wheels effectively guide the track 100 through the guide horns 320 rather than using the traction lugs 330;
 iii. as depicted in FIG. 4, the top portion 337 of the traction lugs 330 should preferably be truncated and rounded;
 iv. as depicted in FIG. 4, the base of the traction lugs 330 should be as wide as possible;
 v. as depicted. in FIG. 5, the exterior surface 338 of each traction lug can be angled more than the interior surface 336.

As shown in FIG. 1, when the track system of the invention is installed on a vehicle 10, the guide wheels 40 which support the vehicle run on the track 100 which is itself disposed on the ground surface. The number of guide wheels 40 should be appropriate for the weight of the vehicle. Indeed, guide wheels 40 support the entire weight of the vehicle as well as resist lateral efforts which may result from turning the vehicle or hitting various objects during the displacement of the vehicle.

As shown in FIG. 8, each guide wheel 40 is formed of two wheels 43 and 44 each of which having a band of rubber (respectively 41 and 42) disposed on its outer perimeter. Each of these rubber bands 41 and 42 contacts the flat surfaces 310 and 315 on the interior 300 of the belt 100. Wheels 43 and 44 are separated from each other so as to form a gorge 49 between them. This gorge is designed to be slightly larger than the width of the guide horns 320 so as to leave a slight gap 45 on each side of the guide horn 320. A gap 47 is also defined between the outer portion of rubber bands 41 and 42 and the interior portion of guide lugs 330. It is preferable that the gap 45 be limited to between $\frac{1}{16}$ of an inch and $\frac{3}{16}$ of an inch in the case of an M113 tank. This spacing is critical as if it is too tight it will cause high friction with the resulting serious inconveniences. On the other hand, if it is too big, it will encourage de-tracking of the track 100 and will render the vehicle much more difficult to be driven in a straight line. In order to increase resistance of the vehicle to de-tracking, it is necessary that the gap 47 as shown be greater than the gap 45.

Guide horns 320 are designed so as to maximise the guiding of the track 100. To do so, side surfaces 322 and 324 must cover an area as large as possible so that their interaction with guide wheels 40 will be such that it creates as close as possible to a continuous rampart between them (see FIG. 1).

However, their length should not be such that it compromises the rotation of the track 100 around the sprocket wheel 20 and the tension wheel 30. Therefore, it is preferable that the guide horns 320 be tapered towards their top surface 329 as shown in FIG. 3 (see also FIGS. 4 and 5). It is also preferable to have the top of each side 322 and 324 of the guide horns tapered in the longitudinal direction corresponding to the movement of the track 100 when the vehicle is moving forward. As a result, the top surface 329 of the guide horn, when viewed from the top (as shown in FIG. 3), defines a triangular surface itself defining a corner 325 on the side of the guide horn which corresponds to the normal movement of the track 100. Without the bevels 326 and 328, the track 100 could have a greater tendency to de-track when lateral forces are applied to the track 100. Indeed, when small lateral forces are applied to the track 100, the side surfaces 322 and 324 of the guide horns 320 will be pushed against the interior of the wheels 40, thus creating an effective rampart preventing the de-tracking of the track 100. However, when large lateral forces are applied to the track 100, the side surfaces 322 and 324 will still be pushed against the interior of the wheels 40 but the track may be so misaligned with the general direction of the vehicle and the wheels 40 that there is a greater opportunity for the track 100 to de-track itself from the vehicle. The angular shape of the bevels 326 and 328 will tend to push back the track 100 in the general direction of the vehicle, thus preventing the de-tracking of the track 100. The use of bevels 326 and 328 thus significantly lowers this risk of de-tracking without significantly diminishing the area of surfaces 322 and 324. The bevels 326 and 328 are thus means added to the guide horns 320 to prevent de-tracking of the track 100.

The height and length of the guide horns 320 depend on the configuration of vehicle 10. However, we have found that it is preferable that the ratio between the height and the width be approximately two. In this way rotation around the sprocket wheel and the tension wheel is adequate without compromising the protection against de-tracking.

It is also extremely important that the guide horns 320 be rigid. If necessary, they should be reinforced with known means which may include fibers and rigid inserts.

Figure 1B:
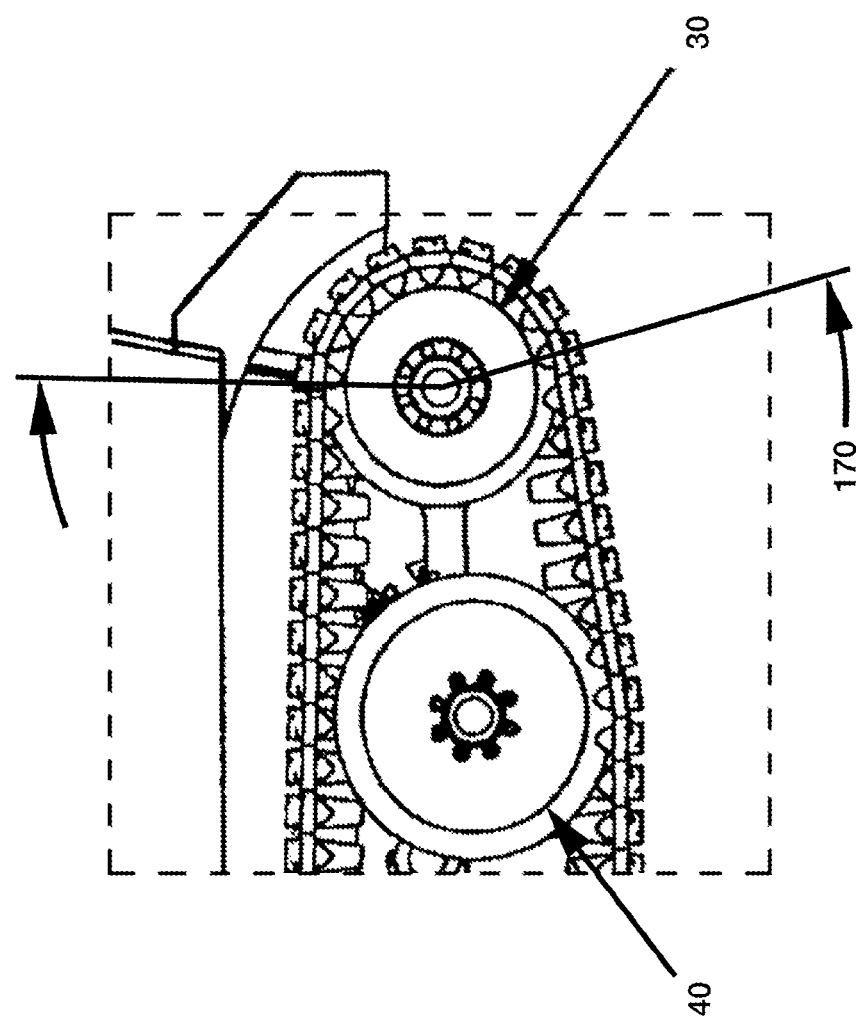
FIG. 1B is a fragmentary and enlarged side view of the tension wheel region of the track system shown in FIG. 1.
Figure 2:
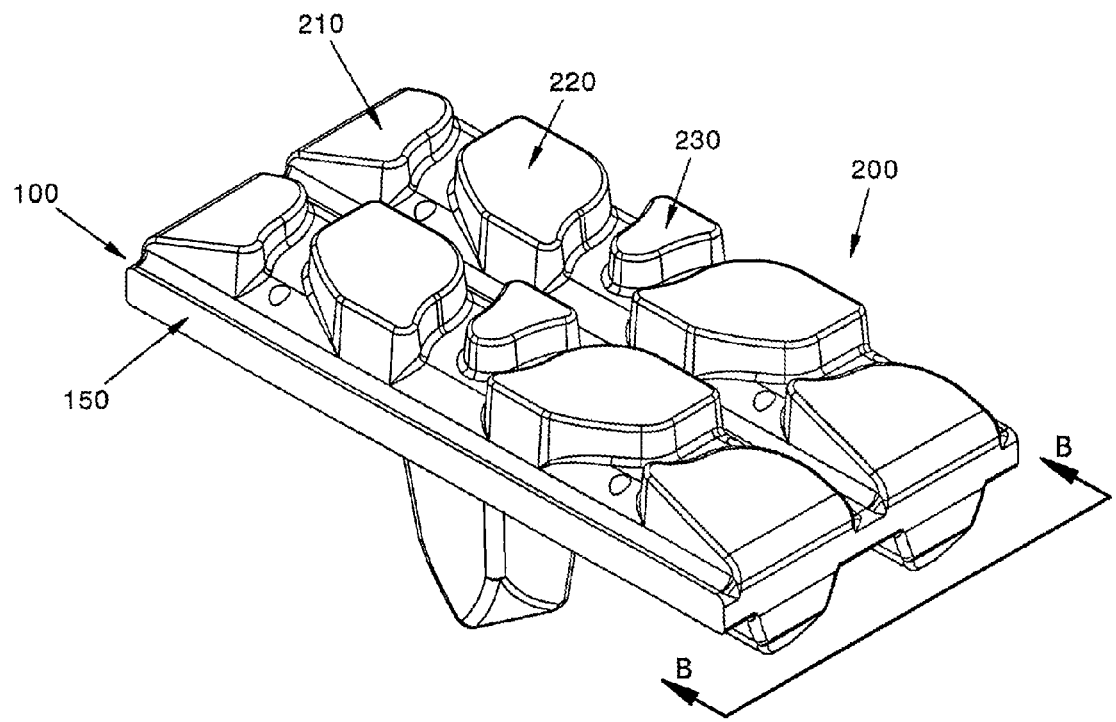
FIG. 2 is a perspective top view of a portion of a track in accordance with the invention.

As shown in FIG. 1 and more particularly in FIG. 1B, when the track 100 is installed on vehicle 10, it is wrapped around tension wheel 30 therefore forming a wrap angle 170 which should preferably be between 30 degrees and 180 degrees. The tension wheel 30 is generally located at the rear of the vehicle and allows to maintain the necessary tension in the track 100 to ensure that the traction lugs 330 maintain an adequate mating relationship with the cavities 23 in sprocket wheel 20.

Figure 9:
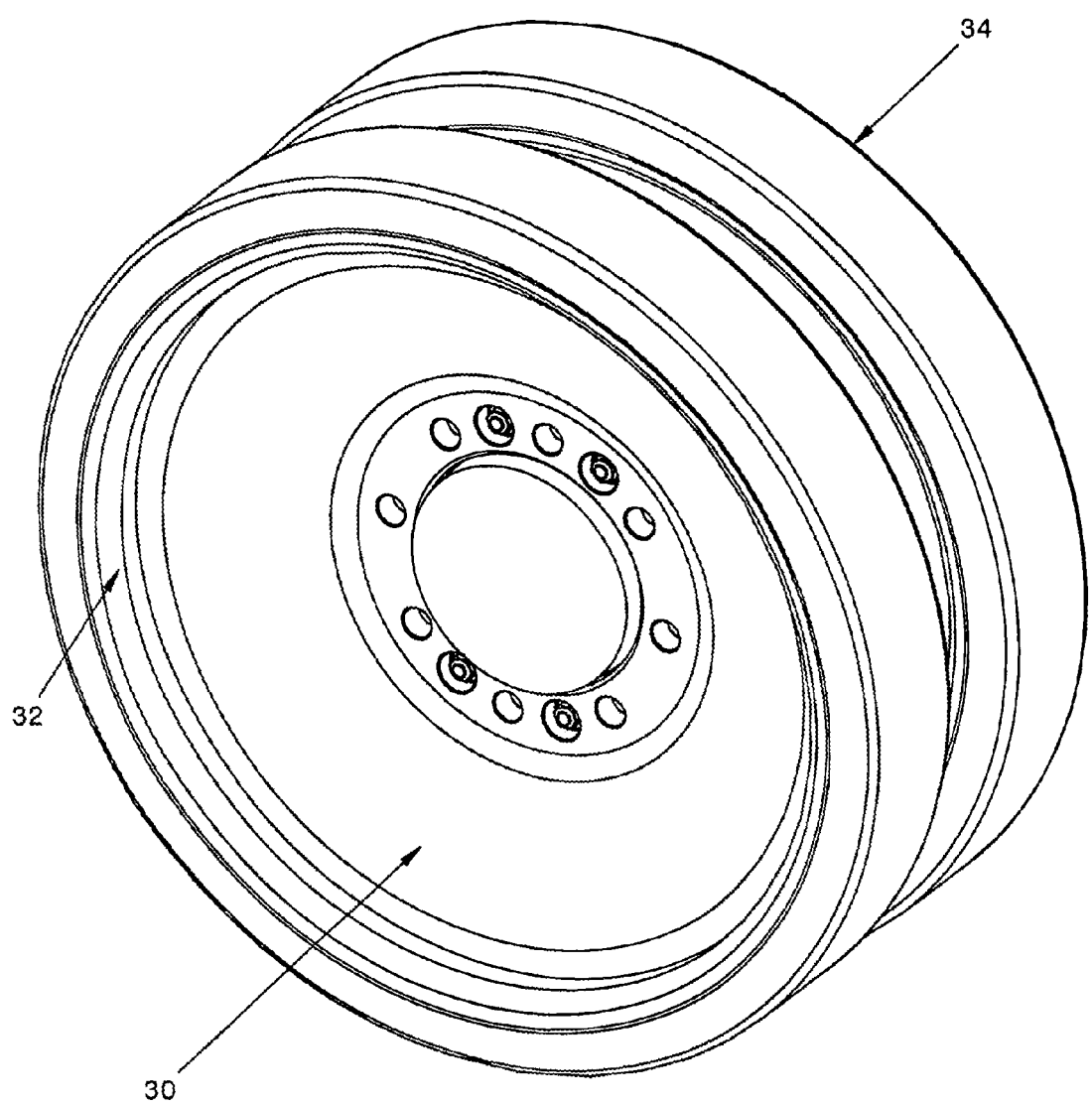
FIG. 9 is a perspective view of a tension wheel for use with a track in accordance with the invention.
Figure 10:
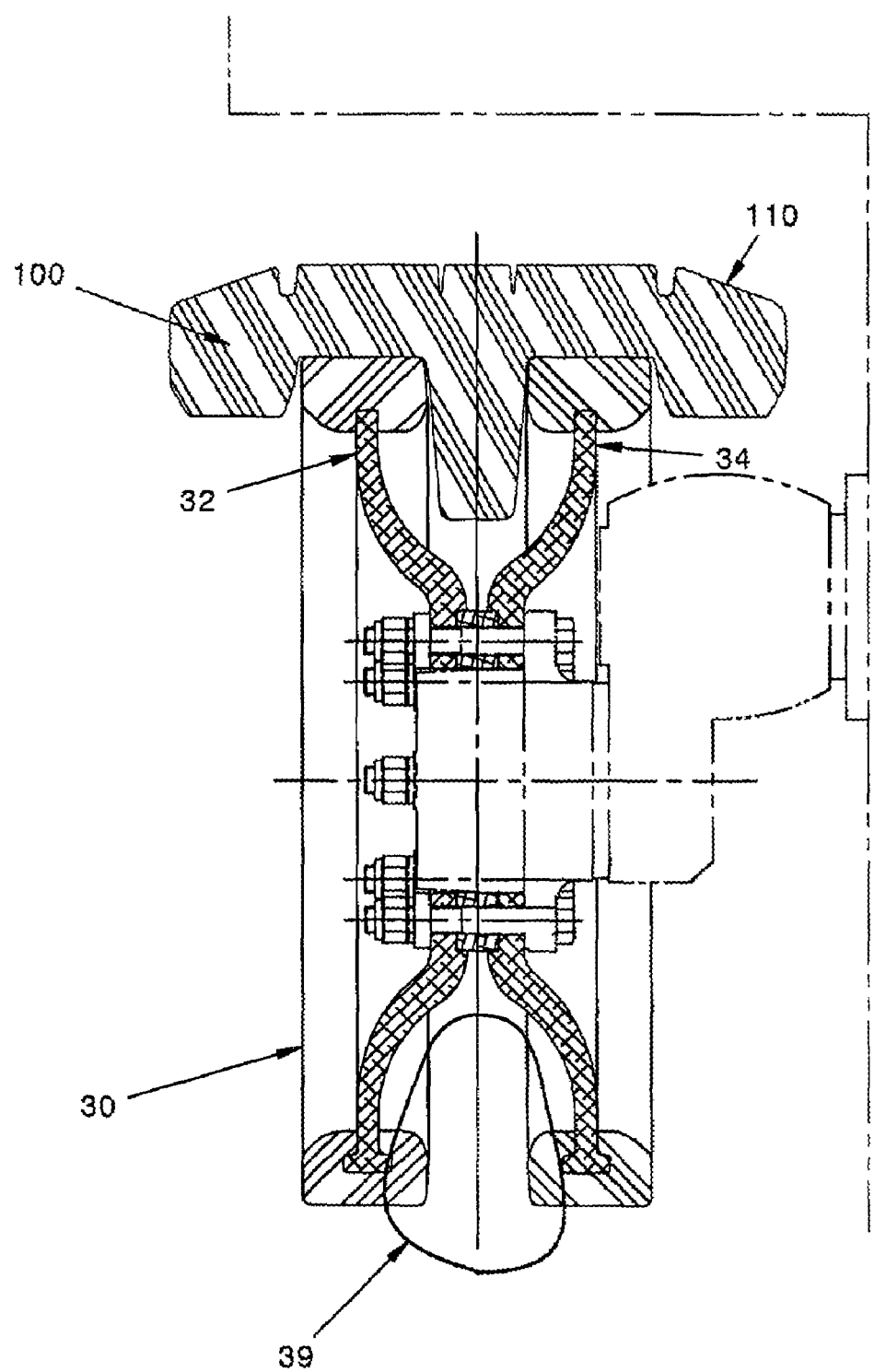
FIG. 10 is a cross section of the tension wheel shown in FIG. 9 taken generally along line E-E as shown in FIG. 1.

As depicted in FIG. 9 and more particularly in FIG. 10, the tension wheel 30 generally comprises inner wheel portion 34 and outer wheel portion 32 between which a gorge 39 is defined. As mentioned above, the gorge 39 is configured to receive the guide horns 320 of the track 100.

The tension wheel 30 should be designed to reduce the wear and abrasion of the track. Therefore, at least its exterior portion should be made of a relatively soft material such as rubber. In order for the tension wheel not to damage the track 100 it is necessary that the track 100 be provided with reinforcing means such as cables, fibers or fabric.

While a preferred embodiment of the invention has been described herein, it should be apparent to those skilled in the art that variations and modifications are possible without departing from the spirit of this invention.

What is claimed is:

1. A track for use on a tracked vehicle made from a polymer adapted to travel over a sprocket wheel, a plurality of guide wheels and a tensioning wheel, said track having a first exterior ground engaging surface and a second interior sprocket wheel engaging surface, said track comprising:
    a) a carcass portion in which reinforcing means are embedded into said polymer;
    b) a plurality of tread lugs disposed on said first engaging surface;
    c) a plurality of drive lugs disposed on said second engaging surface;
    d) a plurality of guide horns disposed on said second engaging surface, each said guide horn having a forward surface, a rear surface, a top surface and two lateral surfaces;
    wherein the upper forward portion of each said lateral surface is bevelled and said top surface tapers toward said front surface.

2. A track as claimed in claim 1, wherein said upper rear portion is not bevelled.

3. A track as claimed in claim 1, wherein said guide horns comprise reinforcing means.

4. A track as claimed in claim 3, wherein said reinforcing means are rigid inserts.

5. A track as claimed in claim 3, wherein said reinforcing means are fibres.

6. A track as claimed in claim 1, wherein said guide horns have a height and width and wherein the ratio between said height and said width is approximately two.

7. A track for use on a tracked vehicle made from a polymer adapted to travel over a sprocket wheel, a plurality of guide wheels and a tensioning wheel, said track having a first exterior ground engaging surface and a second interior sprocket wheel engaging surface, said track comprising:
    a) a carcass portion in which reinforcing means are embedded into said polymer;
    b) a plurality of tread lugs disposed on said first engaging surface;
    c) a plurality of drive lugs disposed on said second engaging surface;
    d) a plurality of guide horns disposed on said second engaging surface;
    wherein each said guide horn comprises de-tracking prevention means.

8. A track as claimed in claim 7, wherein each said guide horns further comprise reinforcing means.

* * * * *